United States Patent
Iemura et al.

(10) Patent No.: US 6,412,348 B1
(45) Date of Patent: Jul. 2, 2002

(54) DYNAMIC LOADING TEST EQUIPMENT FOR A REAL-SIZE VIBRATION-CONTROLLING DAMPER

(75) Inventors: Hirokazu Iemura; Akira Igarashi, both of Kyoto (JP)

(73) Assignee: Kyoto University, Kyoto (JP)

( * ) Notice: Subject to any disclaimer, the term of this patent is extended or adjusted under 35 U.S.C. 154(b) by 49 days.

(21) Appl. No.: 09/591,046

(22) Filed: Jun. 9, 2000

(30) Foreign Application Priority Data

Jun. 11, 1999 (JP) .......................................... 11-164640

(51) Int. Cl.$^7$ ................................................. G01M 7/02
(52) U.S. Cl. ............................... 73/571; 73/594; 73/663
(58) Field of Search ........................... 73/571, 594, 662, 73/663, 666, 667, 672

(56) References Cited

U.S. PATENT DOCUMENTS

| | | | | |
|---|---|---|---|---|
| 4,112,776 A | * | 9/1978 | Ouellette et al. | 73/665 |
| 4,662,133 A | * | 5/1987 | Kondo | 248/636 |
| 4,750,365 A | * | 6/1988 | Haws et al. | 73/594 |
| 5,115,615 A | * | 5/1992 | Miyake et al. | 248/638 |
| 5,185,976 A | * | 2/1993 | Miyake et al. | 52/167 RA |
| 5,663,501 A | * | 9/1997 | Nakamura et al. | 73/579 |
| 5,737,239 A | * | 4/1998 | Horiuchi et al. | 73/663 |
| 5,813,650 A | * | 9/1998 | Tsukamoto et al. | 248/638 |
| 5,970,666 A | * | 10/1999 | Kurabayashi et al. | 52/167.6 |
| 6,263,293 B1 | * | 7/2001 | Scott | 702/113 |

* cited by examiner

*Primary Examiner*—Hezron Williams
*Assistant Examiner*—Rose M. Miller
(74) *Attorney, Agent, or Firm*—Knobbe, Martens Olson and Bear, LLP

(57) ABSTRACT

A floorboard 5 is supported on bridge gate shaped piers 2 so as to move horizontally by rollers 4 provided at the corners of the floorboard. Rubber members 7 installed between the floorboard 5 and the piers 2 restoring force to restitute elastically the floorboard to a neutral position when the floorboard moves horizontally. A shaker 8, which is fixed on the floorboard 5, excites the floorboard linearly and reciprocally by a weight 12 movable along a ball screen shaft 11 with a motor 10. The inertia force of the floorboard 5 generates, in a real-size and real-time scale, vibration for a main structure to which a vibration-controlling damper 15 is installed. The vibration of the floorboard 5 is inputted to the damper 15 and the dynamic response of the damper is observed by a computer 14.

11 Claims, 2 Drawing Sheets

DYNAMIC LOADING TEST EQUIPMENT FOR A REAL-SIZE VIBRATION-CONTROLLING DAMPER

BACKGROUND OF THE INVENTION

1) Field of the Invention

This invention relates an equipment for real-size loading tests of the dynamic response of a vibration-controlling damper to control the vibration of a building or a civil engineering structure.

2) Description of the Prior Art

In the past, three kinds of loading test methods are known as ones for dampers to be used with in building or a civil engineering structure as follows:

① A testing method to detect a damping force of a vibration-controlling device constituting the loading test system on a given loading condition using a force-applying actuator, ② So-called "hybrid load-testing method" in which the dynamic response of a vibration-controlling device is tested by using a force-applying actuator and the restituting force-characteristics of the device obtained by the use of the force-applying actuator is directly adopted to a dynamic response evaluation for a main structure by a computer, and ③ A test method to put a vibration-controlling device and a main structure to be vibrated on a shaking table and excite the entire system.

However, the testing method ① does not make clear the dynamic interaction between the vibration-controlling device and the main structure to be used, so it can detect only the vibration-controlling effect of the device under limited loading conditions.

Moreover, although the testing method ② can detect the test effect of the vibration-controlling device, the test method considers only the displacement of the equipment, not all of the acceleration, the velocity and the displacement thereof. Thus, it can not precisely detect the response reduction effect.

Furthermore, the testing method ③ can not test a large real-size structure such as a building structure or a civil engineering structure because such a structure can not be tested by using a real-size shaking table.

SUMMARY OF THE INVENTION

It is an object of the first invention to suggest a dynamic loading test equipment for a real-size vibration-controlling damper which can detect, in a real-size scale and a real-time basis, a vibration-reducing effect for a structural vibration resulting from an earthquake or a strong wind and to solve the above problem.

It is an object of the second invention to suggest a small and not expensive dynamic loading test equipment for a real-size vibration-controlling device which can recur a given wave profile of a main structure in a real large loading condition and a high velocity condition.

It is an object of the third invention to suggest a dynamic loading test equipment for a real-size vibration-controlling device which can avoid the influence to the loading test results to the utmost.

It is an object of the fourth invention to suggest a dynamic loading test equipment for a real-size vibration-controlling device which can examine the dynamic response of a vibration-controlling damper for a large structure, used for a variety of vibration-controlling dampers and covers an extremely wide dynamic range with accuracy.

It is an object of the fifth invention to suggest a dynamic loading test equipment for a real-size vibration-controlling device which can recur a real time response of a main structure.

The first invention, to realize the above object, relates to a dynamic loading test equipment for a real-size vibration-controlling damper comprising a shaker, a vibration-controlling damper and a floorboard supported so as to return elastically to a neutral position and fixed to the vibration-controlling damper, the floorboard being vibrated and moved linearly to the vibration direction, in which the dynamic response of the vibration-controlling damper is monitored and thereby, the loading test of vibration-controlling damper is carried out.

The second invention, to realize the above object, relates to a dynamic loading test equipment for a real-size vibration-controlling damper in the first invention, wherein the shaker is composed of a movable weight and an electric motor to move the movable weight linearly backward and forward, and directly fixed on the floorboard.

The third invention, to realize the above object, relates to a dynamic loading test equipment for a real-size vibration-controlling damper in the first or second invention, wherein roller bearings are installed between the floorboard and floorboard-supporting members, and the floorboard is provided on and supported by the floorboard-supporting members.

The fourth invention, to realize the above object, relates to a dynamic loading test equipment for a real-size vibration-controlling damper in any one of the first through the third inventions, wherein an elastic member to restitute elastically the floorboard to the neutral position is installed between the floorboard and the floorboard-supporting member.

The fifth invention, to realize the above object, relates to a dynamic loading test equipment for a real-size vibration-controlling damper in the fourth invention, wherein the shaker is operated so that the response of the structure due to an earthquake or a wind at the location of the installation of the vibration-controlling damper can be induced at the floorboard.

According to the first invention, the floorboard is vibrated linearly from the neutral position against an elastic restoring force by the shaker and the vibration of the floorboard is input to the action end of the vibration-controlling device. Then, based on the above input of the floorboard vibration, the dynamic response of the vibration-controlling damper is monitored and thereby, the loading test for the vibration-controlling damper can be carried out.

Consequently, the dynamic loading test equipment of the first invention can detect, in a real-size scale and a real-time basis, a vibration-reducing effect for a structural vibration resulting from an earthquake or a strong wind and to solve the above problem.

According to the second invention, the shaker is composed of the movable weight and an electric motor to move the movable weight linearly backward and forward, and is fixed directly on the floorboard. Consequently, the dynamic loading test equipment of the second invention can be small and economical, and recur a given wave profile of a main structure with a realistic large loading amplitude and a high velocity condition.

According to the third invention, the roller bearings are installed between the floorboard and the floorboard-supporting members and the floorboard is supported by the floorboard-supporting members via the roller bearings.

Consequently, the friction resistance between the floorboard and the floorboard-supporting members is minimized and thereby, does not almost eliminate the influence of the loading test results.

According to the fourth invention, the elastic member to elastically restitute the floorboard to the neutral position is provided between the floorboard and the floorboard-supporting member to support the floorboard. Consequently, dynamic loading test equipment can examine the dynamic response of a vibration-controlling damper for a large structure, used for a variety of vibration-controlling dampers and cover an extremely wide dynamic range with accuracy.

According to the fifth invention, the shaker is operated so that the vibration resulting from the earthquake and the wind can be induced at the floorboard. Consequently, the response of the main structure can be recurred in a real time.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
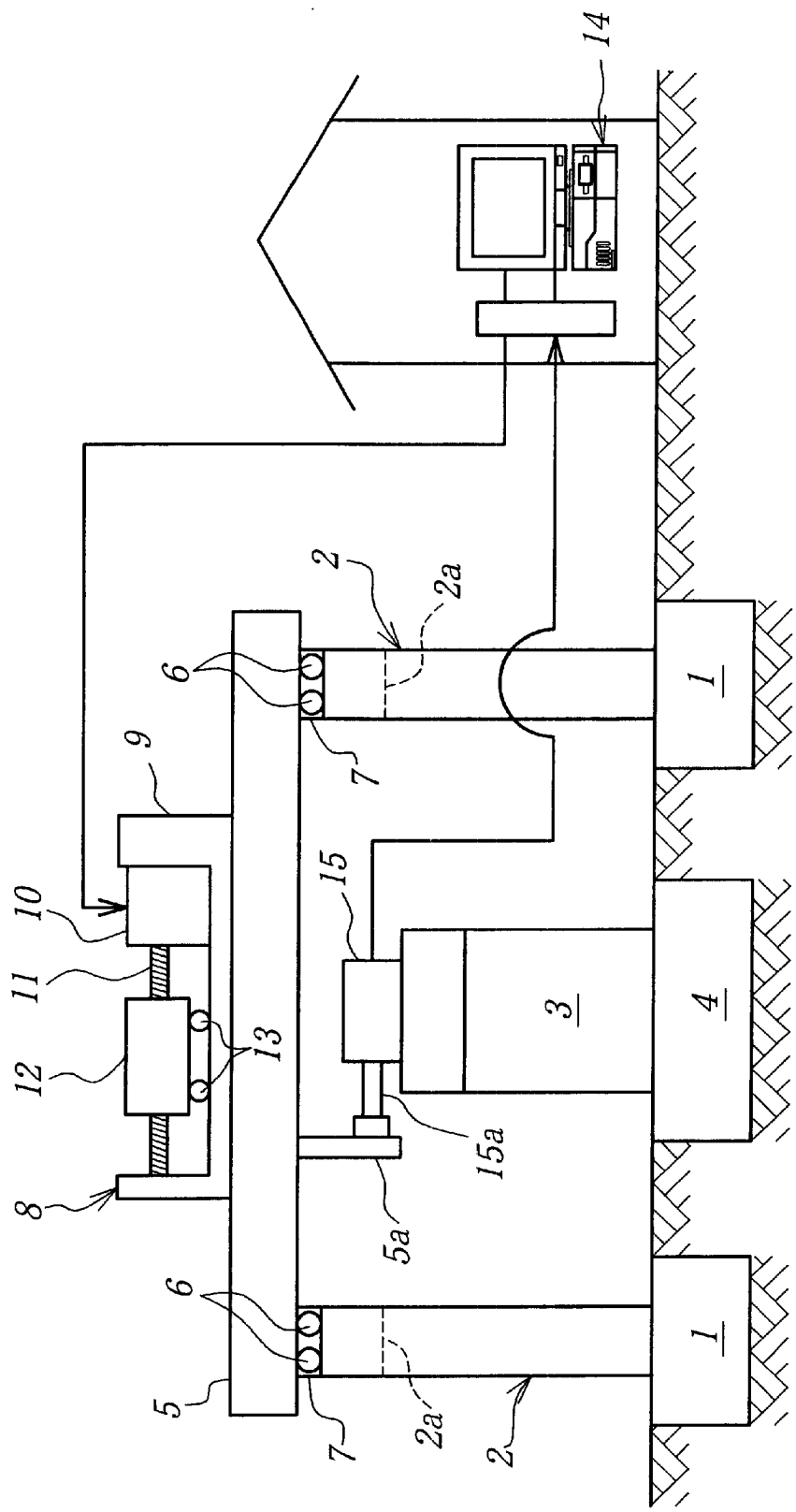
FIG. 1 is an elevational view showing an embodiment in a dynamic loading test equipment for a vibration-controlling real size-damper according to the present invention.
Figure 2:
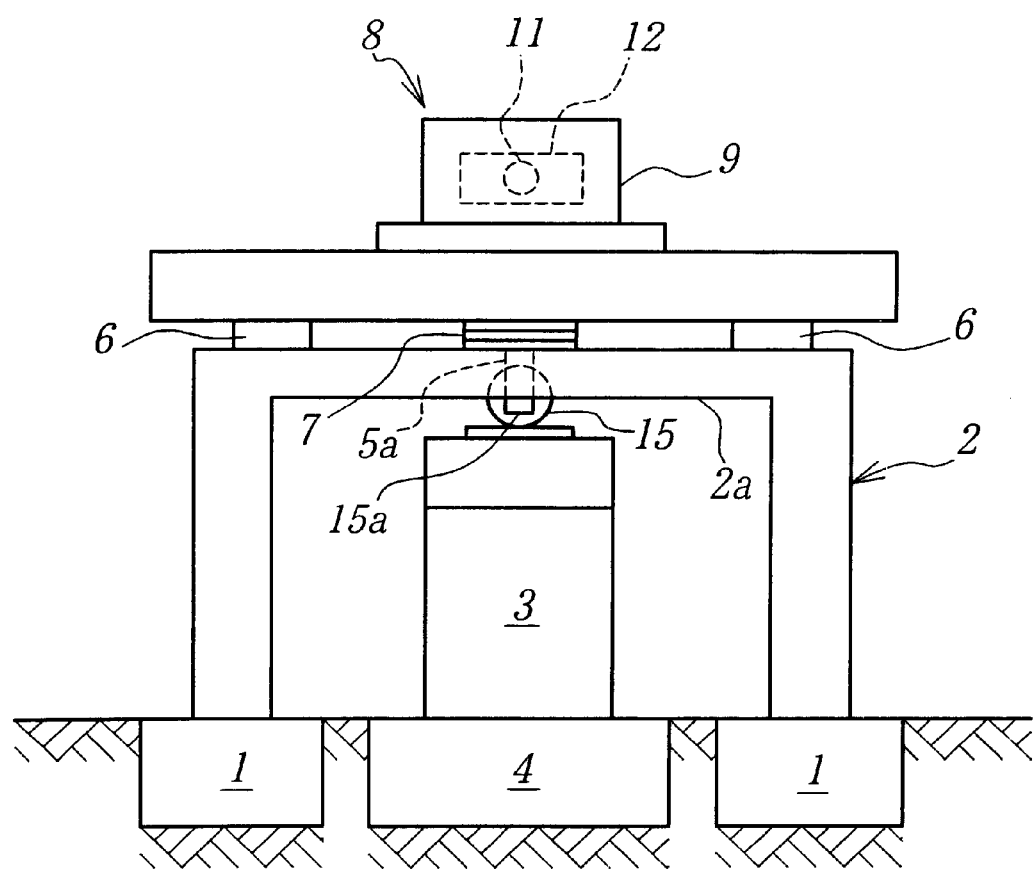
FIG. 2 is a side view of the dynamic loading test equipment of FIG. 1.

The invention will be described in detail as follows:

FIG. 1 is an elevational view showing an embodiment of the dynamic loading test equipment for a vibration-controlling real size-damper according to the present invention, and FIG. 2 is a side view of the dynamic loading test equipment of FIG. 1.

On foundations 1 embedded in the ground are provided in stand gate shaped piers 2, which are arranged separately in a horizontal direction in FIG. 1. The heights and the distance of the pier studs are determined so that a technician or an experimenter can work in the space formed by the piers.

Then, between the piers is provided a damper apron 3 which stands on the foundation 4 embedded in the ground.

On the piers 2 is provided to support a floorboard 5, which bridges the upper beams 2a of the piers 2. Roller bearings 6 are installed between the floorboard and the piers on the upper beam 2a.

The roller bearings 6 are provided so that their rotation axes may extend in the direction parallel to the longitudinal direction of the upper beam 2a. Accordingly, the floorboard 5 can be moved to the arranged direction of the piers (the horizontal direction in FIG. 1).

Moreover, a rubber bearing 7 as an elastic member, which is changeable, is installed between the center of each upper beam 2a and the floorboard 5, and thereby, the horizontal movement of the floorboard 5 is restricted by the elastic deformations of the rubber bearing 7.

Besides, the rubber bearing 7 generates a restoring force to elastically return to the neutral position corresponding to the horizontal displacement of the floorboard 5.

On the floorboard 5 is set a shaker 8, of which basement 9 is fixed on the floorboard 5.

An electric motor 10 such as an AC servo motor is provided in the basement 9. Then, a shaft 11, which is driven by the motor 10, extends in the arrangement direction of the piers 2 (the horizontal direction in FIG. 1) and its forefront is supported by the basement 9 so that the shaft can rotate freely.

A movable weight 12 is screwed to the shaft 11 with ball screws and thereby, is set onto the basement 9. The weight is supported by rollers 13 so that the movement of the weight in the extending direction of the shaft 11 is allowed.

The electric motor 10 is controlled by a computer 14 serving as a shaker controlling equipment, and can rotate reversibly, leading to the linearly backward and forward movement of the movable weight 12 in a given frequency and a given amplitude. The movement acts on the floorboard 5 via the basement 9 as an inertia force generated by the acceleration of the movable weight.

The floorboard 5 vibrates in the applied direction of the inertia force. In this case, the weights of the floorboard and the movable weight are determined so that the structure to which the vibration-controlling damper should be used can be excited in a real-size scale and a real-time basis.

In this manner, a vibration system including the floorboard 5 with a given driving characteristics is composed, and its optimum stiffness can be adjusted by changing the rubber bearings 7.

A vibration-controlling damper 15 as the specimen to be tested by a vibration of the vibration system is fixed on the damper apron 3, and the action end 15a of the vibration-controlling damper 15, which is composed of a damper piston, etc., is coupled to the loading arm 5a fixed perpendicularly to the lower surface of the floorboard 5.

The computer 14 serves as the vibration-controlling equipment to vibrate the floorboard 5 in a given frequency and a given amplitude via the reversible rotation control of the electric motor 10 as mentioned above, and besides, as an observation-controlling equipment to measure the dynamic response of the vibration-controlling device 15 at the input of the vibration thereto.

Hereupon, its shaker-controlling algorithm controls the vibrator 8 and the electric motor 10 in a real time so that the floorboard 5 can detect the dynamic response due to an earthquake or a wind of the place in which the dynamic response-loading test equipment including the vibration system is set.

The operation for the above-mentioned test equipment will be explained hereinafter.

When a sinusoidal loading test is carried out, the shaker 8 is controlled so as to generate a vibration amplitude corresponding to the specified constant amplitude.

When a dynamic response test under wind or earthquake loading condition is carried out, the shaker 8 (the electric motor 10) is controlled so as to obtain the adjusted and calculated acceleration input of the movable weight 12 to reflect the dynamic response of the main structure to be used with the damper.

The effects of the present invention are classified into two groups: ① the enhancement of the practicability and the economical efficiency in the dynamic response test and ② the improvement of the test condition and the loading process.

① The Enhancement of the Practicability and the Economical Efficiency in the Dynamic Response Test Up to the present, in the real-size test of vibration-controlling dampers for large-scale structures, the method to connect the hydraulic actuator in the displacement-controlling mode and to input a determined displacement wave profile has been generally used.

However, the actuator for the test is requested to be high velocity operation despite of its very large weight, large size and large capacity, resulting in the excessive cost. Thus, the test using such an expensive equipment is extremely restricted, which is not widely used.

On the contrary, the above test equipment can generate a large inertia force due to the large weight of the floorboard 5 itself. Consequently, a testing system including the above vibration-controlling damper can be fabricated easily and in low cost without such a large- size and a large-capacity hydraulic actuator, and its testing procedure can be made easy.

Moreover, since the floorboard 5 returns to the neutral position by rubber bearings 7, the test can be carried out repeatedly without the damage and destruction of the main structure to be tested as in a large amplitude-loading test using a large shaking table.

The above test equipment covers a very wide range of amplitude and can detect a large amplitude of the structural response due to a strong earthquake, etc. and also a relatively small amplitude of a structural response due to a wind.

② The Enhancement of the Test Condition and the Loading Process

The conventional testing methods can not reflect the influences of the displacement, the velocity and the acceleration of the damper to the loading condition because the response of the test structure is reduced due to the dynamic response of the damper.

Consequently, test results does not always show the realistic behavior of the damper perfectly.

As a test method to consider the displacement, the velocity and the acceleration of the damper, a real time-online hybrid testing method is suggested, but at present, is in the development stage. Thus, the method is not established as a generally used testing method.

Moreover, the real time-online hybrid testing method can explicitly simulate the loading condition for seismic input such as the displacement, and the velocity of the response, but not the acceleration thereof.

Furthermore, the testing method have difficulty in being employed for a test structure with a extremely large stiffness.

On the contrary, with the use of the above test equipment, the loading condition of the damper contains the behavior of the structure to be tested including the installed damper. Accordingly, the displacement, the velocity and the acceleration of the vibration of the test structure is simulated and thereby, the above problems in the conventional testing methods can be circumvented.

Moreover, the damper having a large stiffness can be employed for the test equipment of the present invention.

Although the present invention was described in detail with reference to the above examples, this invention is not limited to the above disclosure and every kind of variation and modification may be made without departing from the scope of the present invention.

What is claimed is:

1. A dynamic loading test equipment for a real-size vibration-controlling damper comprising a shaker, a vibration-controlling damper, and a supported floorboard returnable elastically to a neutral position, said floorboard being connected to the vibration-controlling damper, the floorboard being movable linearly to a vibration direction when being vibrated by the shaker, wherein the dynamic response of the vibration-controlling damper due to the vibration of the floorboard is monitored, whereby a loading test of the vibration-controlling damper is carried out.

2. A dynamic loading test equipment for a real-size vibration-controlling damper as defined in claim 1, wherein the shaker is composed of a movable weight and an electric motor to move the movable weight linearly and reciprocally, and is directly fixed on the floorboard.

3. A dynamic loading test equipment for a real-size vibration-controlling damper as defined in claim 1, further comprising (i) a floorboard-supporting member which supports the floorboard provided thereon, and (ii) roller bearings installed between the floorboard and the floorboard-supporting member.

4. A dynamic loading test equipment for a real-size vibration-controlling damper as defined in claim 1, further comprising (i) a floorboard-supporting member, and (ii) an elastic member provided between the floorboard and the floorboard-supporting member, said elastic member elastically restituting the floorboard to the neutral position.

5. A dynamic loading test equipment for a real-size vibration-controlling damper as defined in claim 4, wherein the shaker vibrates the floorboard to induce the response of a structure due to an earthquake or a wind at the location where the vibration-controlling damper is installed.

6. A dynamic loading test equipment for a real-size vibration-controlling damper as defined in claim 2, further comprising (i) a floorboard-supporting member which supports the floorboard provided thereon, and (ii) roller bearings installed between the floorboard and the floorboard-supporting member.

7. A dynamic loading test equipment for a real-size vibration-controlling damper as defined in claim 2, further comprising (i) a floorboard-supporting member, and (ii) an elastic member provided between the floorboard and the floorboard-supporting member, said elastic member elastically restituting the floorboard to the neutral position.

8. An apparatus for dynamic loading tests of a real-size vibration-controlling damper designed to be installed in an architectural structure, comprising:

a floorboard supported on a support via bearings to allow the floorboard to vibrate and move in response linearly to force exerted on the floorboard, and to return elastically to a neutral position when no force is exerted;

a shaker connected to the floorboard to provide force to vibrate and move the floorboard, said force being predetermined to reflect a dynamic response of the architectural structure with a vibration-controlling damper;

a damper apron for supporting a real-size vibration-controlling damper to be tested, wherein a loading arm of the damper supported on the damper apron is fixed to the floorboard to linearly transmit the vibration and movement of the floorboard to the damper; and a monitoring device for monitoring a dynamic response of the damper in response to the vibration and movement of the floorboard caused by the shaker, to test dynamic loading characteristics of the damper.

9. The dynamic loading test apparatus according to claim 8, wherein the shaker comprises a movable weight and an electric motor to move the movable weight back and forth to vibrate and move the floorboard.

10. The dynamic loading test apparatus according to claim 8, wherein the bearings interposed between the floorboard and the support comprises roller bearings and elastic bearings.

11. The dynamic loading test apparatus according to claim 8, wherein the force provided by the shaker is predetermined to test a response of the architectural structure with the damper in response to an earthquake or a wind.

* * * * *